(12) United States Patent
Lam et al.

(10) Patent No.: US 6,554,229 B1
(45) Date of Patent: Apr. 29, 2003

(54) AILERON FOR FIXED WING AIRCRAFT

(76) Inventors: Lawrence Y. Lam, 27013 Woodbrook Rd., Rancho Palos Verdes, CA (US) 90275; Michael Lam, 23600 Camino Hermoso, Los Altos Hills, CA (US) 94024

(*) Notice: Subject to any disclaimer, the term of this patent is extended or adjusted under 35 U.S.C. 154(b) by 0 days.

(21) Appl. No.: 09/581,951
(22) PCT Filed: Dec. 3, 1998
(86) PCT No.: PCT/US98/25199
§ 371 (c)(1),
(2), (4) Date: Sep. 20, 2000
(87) PCT Pub. No.: WO99/30967
PCT Pub. Date: Jun. 24, 1999

(51) Int. Cl.$^7$ ................................................ B64C 9/06
(52) U.S. Cl. ...................................................... 244/217
(58) Field of Search .......................... 244/90 A, 90 R, 244/216, 217

(56) References Cited

U.S. PATENT DOCUMENTS

| | | |
|---|---|---|
| 1,504,663 A | 8/1924 | Wright |
| 1,841,804 A | 1/1932 | Hall |
| 1,875,593 A | 9/1932 | Hall |
| 1,992,157 A | 2/1935 | Hall |
| 1,992,158 A | 2/1935 | Hall |
| 2,018,546 A | 10/1935 | Clark |
| 2,045,269 A | 6/1936 | Henderson |
| 2,045,463 A | 6/1936 | Hall |
| 2,136,845 A | 11/1938 | Fenton ................... 244/217 X |
| 2,138,326 A | 11/1938 | Pouit |
| 2,152,974 A | 4/1939 | Riviere |
| 2,156,403 A | 5/1939 | Riviere |
| 2,158,092 A | 5/1939 | Taylor |
| 2,173,538 A | 9/1939 | McKellar |
| 2,241,335 A | 5/1941 | Wedberg ..................... 244/217 |
| 2,254,304 A | 9/1941 | Miller |
| 2,279,615 A | 4/1942 | Bugatti |
| 2,407,401 A | 9/1946 | Clauser et al. |
| 2,427,980 A | 9/1947 | Stinson et al. |
| 2,434,341 A | 1/1948 | Anderson ................... 244/217 |
| 2,445,833 A | 7/1948 | Kraemer et al. |
| 2,582,348 A | 1/1952 | Northrop et al. |
| 2,612,329 A | 9/1952 | Crandall et al. ............. 244/217 |
| 2,665,084 A | 1/1954 | Feeney et al. .............. 244/217 |
| 2,772,058 A * | 11/1956 | Grant ......................... 244/216 |
| 2,791,385 A | 5/1957 | Johnson |
| 3,041,014 A | 6/1962 | Gerin |
| 3,120,935 A | 2/1964 | Perrin |
| 3,456,904 A * | 7/1969 | Dorand ................... 244/217 X |
| 3,478,988 A * | 11/1969 | Röed ...................... 244/216 X |
| 4,003,533 A | 1/1977 | Carter et al. ........... 244/113 X |
| 4,049,219 A | 9/1977 | Dean et al. ................. 244/217 |
| 4,180,222 A | 12/1979 | Thornburg .............. 244/215 X |
| 4,669,687 A * | 6/1987 | Rudolph .................. 244/216 X |
| 4,717,097 A | 1/1988 | Sepstrup ..................... 244/217 |
| 4,720,062 A | 1/1988 | Warrink et al. ........... 244/90 R |
| 5,655,737 A | 8/1997 | Williams et al. ......... 244/217 X |
| 6,079,672 A | 6/2000 | Lam et al. .................. 244/217 |

* cited by examiner

Primary Examiner—Robert P. Swiatek
(74) Attorney, Agent, or Firm—Burns, Doane, Swecker & Mathis, L.L.P.

(57) ABSTRACT

An aircraft aileron system (10, 10) is comprised of two panels (12, 14, 28, 30, 62, 70) located at the rear portion of the wing (W24, 54), in a spanwise direction and aligned with the wing's trailing edge. The panels are independently hinged at their leading edges and rotate to make angular deflections with respect to the wing. The upper, aileron panel (12, 30, 62) is restricted to upward deflection only from its neutral position and in operation is deployed independently as an aileron. The lower, auxiliary flap panel (14, 28, 70) is capable of both upward and downward deflections from its neutral position, and is deployed independently downward as an auxiliary flap. Both panels are deployed together upwardly only as an aileron. Alternatively, the auxiliary flap panel is capable of downward deployment only, to provide a simpler aileron system. For roll control of an aircraft during cruise, the aileron panel on one side only is deflected up while the aileron panel on the other side remains in its neutral position.

31 Claims, 9 Drawing Sheets

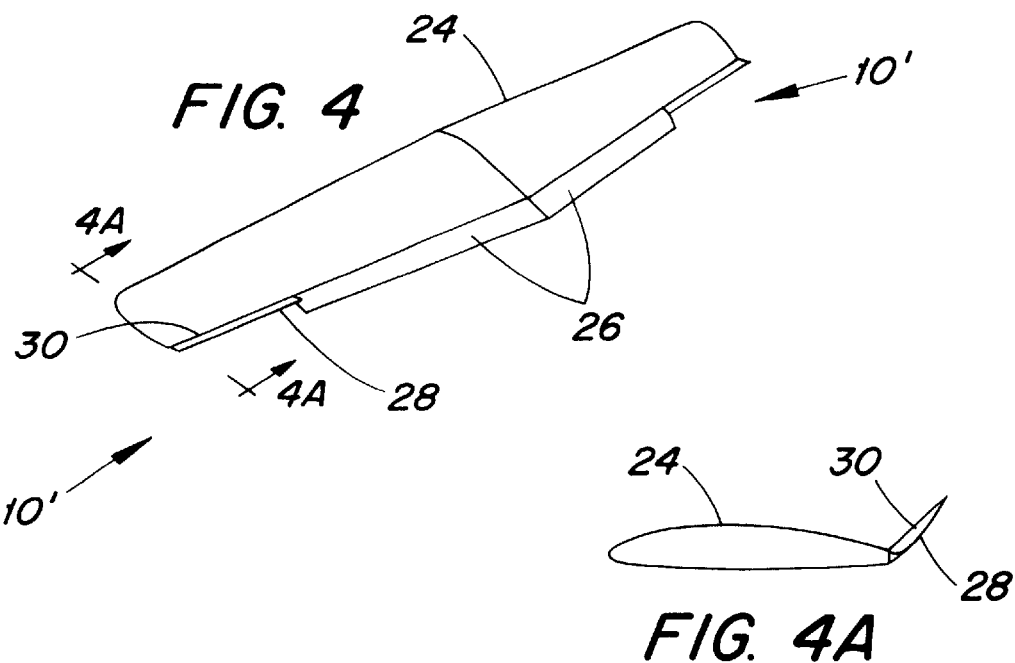
FIG. 4
FIG. 4A
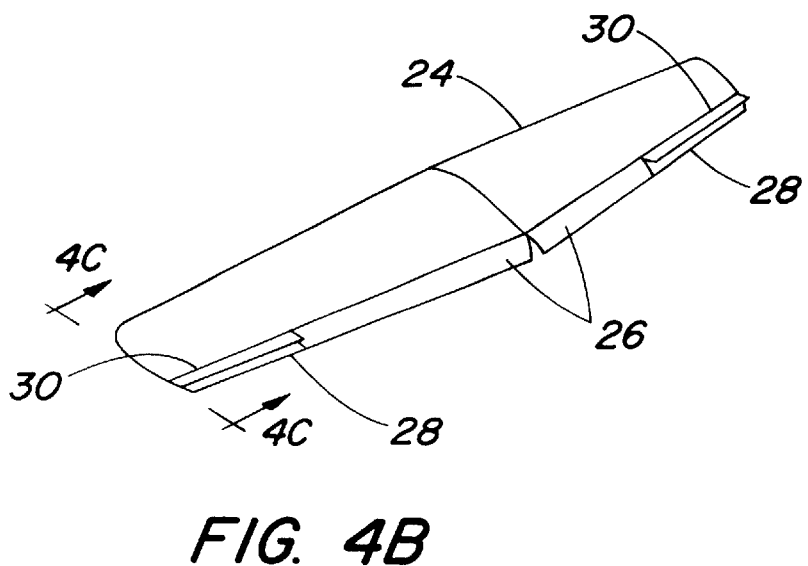
FIG. 4B
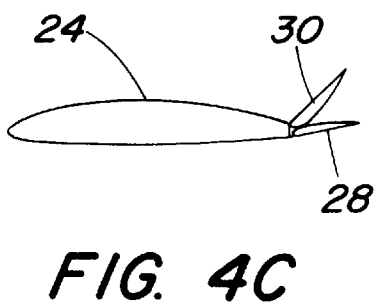
FIG. 4C

AILERON FOR FIXED WING AIRCRAFT

BACKGROUND OF THE INVENTION

1. Field of the Invention

The present invention relates to aircraft flight control devices, and more particularly to wing-mounted control devices. More specifically, the invention relates to an improved aileron system especially suitable for fixed-wing aircraft which provides a flight control system having improved efficiency and versatility.

2. Related Art

Immediately obvious with the invention of the airplane was the importance of controlling movement in flight, as an uncontrollable airborne airplane will soon crash. Aviators soon settled on ailerons for roll control. An aileron is a hinged panel on the trailing edge of the wing, usually located at the outboard portion of the wing, which, when deflected downwardly, increases the lift of that wing, to roll or bank the airplane into a turn. At the same time, the aileron on the other wing is deflected upwardly, to decrease the lift on that wing and thus augment the rolling motion. The configuration and application of the conventional aileron system has changed little, if at all, over more than nine decades since the first fixed-wing aircraft were produced.

One of the most objectionable features of conventional aileron application is a phenomenon known as "adverse yaw," and virtually all existing fixed-wing aircraft suffer disadvantageous consequences associated with adverse yaw. When a turn is initiated with conventional ailerons, the nose of the airplane turns first in a direction opposite to that of the intended turn. This is usually compensated by using rudder deflection to "coordinate" the turn. The adverse yawing motion is a direct result of aileron application. While producing more lift to bank the airplane into a turn, the downwardly-deflected aileron also produces more drag, which acts momentarily to cause the airplane's nose to turn in the direction opposite to the intended turn. That is, when one wing is lifted relative to the other wing by operation of a conventional aileron to bank the airplane into a turn, it is also pulled back away from the turn relative to the wing on the other side, causing the nose initially to turn, or yaw, in the direction opposite to the turn. This effect becomes increasingly detrimental as the roll rate increases and/or airspeed decreases.

Adverse yaw produced by the conventional aileron contributes to spin entry. Instinctive application of conventional ailerons during attempted spin recovery merely aggravates the spin condition. When spinning, an airplane is descending and turning in a tight spiral flight path. The conventional aileron is not effective in spin recovery. In a left hand spin, for instance, the left wing is down and toward the center of the spiral. Instinctively, many pilots are tempted to initiate right stick or control yoke movement to roll towards the right and out of the spin. With conventional ailerons this will deploy the left aileron down and the right aileron up. The left aileron will create more drag than the form drag caused by the up-going right aileron and the spin will be further aggravated. For an airplane equipped with conventional ailerons application of rudder alone is used for spin recovery. Much of spin training involves conditioning pilots to avoid the instinctive attempt to roll out of the spin. Nonetheless, many pilots have aggravated spins by attempting such recoveries with conventional ailerons.

Various methods and devices have been used to counter adverse yaw. Among them are the differential aileron with its finite deflection ratio, and the spoiler. The differential variation of conventional ailerons is the most commonly used solution and provides some marginal improvement, but has limitations. Use of spoilers may obviate adverse yaw, but spoilers present their own problems. Spoilers are so named because they spoil or effectively eliminate lift. Ailerons deliver continuously variable changes in lift within their operational envelopes, whereas spoilers operate in a stepwise manner, being functionally either on or off, and thus are difficult to modulate between full and zero effect. Roll control is difficult to achieve with spoilers without complicated sub-systems or augmenting devices.

Another disadvantage of conventional ailerons is that they also require commitment of a sizable portion of the trailing edge of the wing that could otherwise be used for beneficial high-lift devices. Such devices allow lower approach, landing and takeoff speeds, especially advantageous for heavy, high-speed commercial and high-performance military aircraft.

There are several prior-art devices which, at first glance, may appear very similar to the present invention. On closer examination, however, none of them yields the stated results or functional capabilities of this invention. Most of the previously employed devices are designed and applied as drag devices, such as ground control spoilers, drag rudders, dive brakes, or nominal flaps.

Examples of devices known in the art which are deployed upwardly to provide aircraft control may be found in the following U.S. patents:

| | | |
|---|---|---|
| 1,504,663 | Wright | Aug. 12, 1924 |
| 2,136,845 | Fenton | Nov. 15, 1938 |
| 2,138,326 | Pouit | Nov. 29, 1938 |
| 2,152,974 | Riviere | April 4, 1939 |
| 2,158,092 | Taylor | May 16, 1939 |
| 2,254,304 | Miller | Sept. 2, 1941 |
| 2,407,401 | Clauser et al. | Sept. 10, 1946 |
| 2,791,385 | Johnson | May 7, 1957 |
| 3,120,935 | Perrin | Feb. 11, 1964 |
| 4,717,097 | Sepstrup | Jan. 5, 1988 |

Pouit describes a flap which acts more like a present-day spoiler, to prevent aircraft capsizing. In a variation, the flap has separate upper and lower elements, of which the upper element is simply hinged, and can be extended upwardly only by the upper deflection of the lower, actuated element. The upper flap member is not capable of movement independent of the lower member. Both wing flaps are operated together. Perrin describes a glider control system wherein the aileron has a secondary aileron which can be extended up to act as a drag rudder for directional yaw control in place of a rudder.

Fenton relates to a device which is basically a flap with small, subsidiary flaps on the upper and lower trailing edges. The subsidiary flaps are moved up or down through fixed, predetermined displacement, to control aircraft roll movement, with the deployment of the subsidiary flap on each side of the aircraft controlled such that when the subsidiary flap on one side is up, the corresponding subsidiary flap on the other side is down. Due to their small size, the effectiveness of the subsidiary flaps is doubtful.

Clauser et al. provide a lateral control arrangement having an airfoil member pivoted near the tip of the wing which functions as an aileron and a flap, or an "ailerflap," and a second airfoil member, or a "slot lip," pivoted above the ailerflap. Each element can pivot up and down about its neutral position. The slot lip regulates the slot spacing between the wing's trailing edge and the leading edge of the ailerflap, to alter the lift provided by the ailerflap during takeoff and landing. During flight, lateral control is achieved with the ailerflaps operated conventionally as ailerons. The slot lips move in unison with the ailerflaps, and are not capable of independent upward movement.

Johnson relates to a landing control system having a spoiler located above a conventional flap. The downwardly extending flap is used to augment lift, and the upwardly extending spoiler act as a drag plate during landing approach. The flap and spoiler on both wings are actuated simultaneously.

Miller provides a split aileron which is a combination aileron and flap. Each wing has an aileron extending almost the full span, and a flap pivoted beneath the aileron. The aileron functions conventionally, and size of the flap is limited to that of the aileron. Wright et al. describes a split flap arrangement wherein a lower element pivots down as a flap and an upper element, which pivots up and down, serves as an aileron. Riviere, Taylor and Sepstrup disclose split aileron arrangements.

Other examples of control surfaces which are formed of two, separately hinged sections and can be deployed together up and down as conventional flaps or ailerons, and are also capable of separating from each other to provide flap and air brake functions, are described in U.S. Pat. Nos. 2,427,980, 2,445,833, 2,612,329 and 2,582,348.

More recently flaperons have been employed which function both as flaps and ailerons, and offer pseudo-full-span flaps. They, however, greatly compromise the roll function and produce even greater adverse yaw than the conventional aileron when roll function is needed. Spoilers attempt to achieve objectives similar to those of the present invention, but at a great compromise in flight characteristics. Spoilers tend to have dead bands and are difficult to modulate. They, after all, "spoil" rather than modulate lift. Roll control systems involving spoilers have been used on aircraft with mixed results.

The conventional differential aileron used on most existing aircraft lessens but does not eliminate adverse yaw. It occupies a sizable portion of the wing's trailing edge, thus preventing the installation of full-span flaps. With some aircraft designs, high roll rates have been sought with the use of full-span ailerons, thus obviating entirely the installation of flaps. Other aircraft designs have sacrificed ailerons for full-span flaps, necessitating the inefficient use of tail planes or wing spoilers for roll control. No other flight control devices have the versatility or efficiency of the present invention. The Frise aileron also claims to lessen adverse yaw by deliberately creating more drag on the upwardly-deflecting aileron. This device also does not allow installation of a full-span flap.

The device closest in construction and function to the present aileron system was invented by the inventors of the present invention. Presented as the "Delta aileron" which was placed on top of a one-piece full-span flap, it has some of the features of this invention. But, it is not aerodynamically as efficient and offers less functional capability than the present invention. For example, it does not have an auxiliary flap and in its present form cannot be used as a drag rudder.

SUMMARY OF THE INVENTION

The aileron system of the present invention simultaneously eliminates all the above problems while offering desirable features not possessed by conventional ailerons. Accordingly, an object of the invention is to provide an aileron system which is simple in design and construction, and more importantly, in its unique method of deployment and the functional results obtained. Other objects of the invention are to provide an aileron system of the foregoing type which: eliminates adverse yaw associated with previous aileron roll control systems; provides benefits in spin avoidance and spin recovery; can be deployed for flight path control, air braking and as a drag plate; results in a wing which is cleaner, with fewer actuating mechanisms, and is aerodynamically efficient and correct in operation; allows for the incorporation of full-span flaps and other high-lift devices on the trailing edge of a wing; and provides an overall aircraft control system which is simpler in construction and requires fewer components, is less expensive, reduces maintenance requirements, reduces weight, and provides the aircraft with lower takeoff and landing speed capabilities, with the advantages attendant therewith.

The present invention is basically used for roll control of fixed-wing aircraft around the longitudinal axis. It is a combination of aerodynamic control surfaces which deflect upwardly only when deployed for roll control. By operating these surfaces judiciously and in conjunction with their counterparts on the other wing, and the flap systems, many favorable results may be obtained for the control of aircraft.

The aileron system of the present invention is similar in shape and external appearance to the conventional aileron, but its construction and deployment are entirely different. It is comprised of two panels located at the rear portion of the wing, in a spanwise direction and aligned with the wing's trailing edge. The panels may be independently hinged at their leading edges or may be hinged on a common axis and rotate to make angular deflections with respect to the wing. The upper or aileron panel is deflected upwardly only from the neutral position, while the lower, auxiliary flap is capable of both upward and downward deflections from the neutral position. The upper panel is deployed independently as an aileron and the lower panel is deployed independently as an auxiliary flap. Both panels are deployed together upwardly only as an aileron.

For roll control of an aircraft during cruise, the aileron panel on one side only is deflected up while the aileron panel on the other side remains in its neutral position. The auxiliary flap panel is arranged to move with the aileron panel as a unit, such that the two surfaces form an "aileron" in the usual sense. To roll left, for example, the aileron of the present invention on the left wing is deflected up, while the aileron on the right wing remains in the neutral position. The upwardly-deflected left aileron results in a negative change in the wing's lift coefficient, decreasing the lift on the left wing relative to that of the right wing, and producing a roll to the left. Effectively joining the upper and lower panels to move as a unit preserves the smooth contour of the airfoil. In the deflected mode it is the equivalent of an airfoil with a reflex camber. Aerodynamically this is a much more efficient "aileron" than that achieved by deflecting only the upper panel upwardly.

During flap deployment, the lower auxiliary flap panel is disengaged from the upper aileron panel, and operated to move with the main wing flaps to form a full-span flap. The upper aileron panel is then moved independently to provide roll control. Only the auxiliary flap panel is arranged to move in conjunction with the aileron in the roll control mode. The panel used as a dedicated flap is unaffected.

For use on small, general aviation aircraft, a simpler version of the aileron system may be utilized to facilitate construction and minimize weight. The auxiliary flap panel may be left to function completely independently of the aileron panel. Its stowed position would be the neutral position, and it would move downwards only as a flap. The auxiliary flap panel would not accompany the aileron panel in its upward excursions.

The aileron system of the present invention is placed at the trailing edge of the wing in much the same location as a conventional aileron. However, the inventive aileron is deflected upwardly only. As with other ailerons, deflection results effectively in a change of the airfoil's camber and thus a change in the lift coefficient, $C_L$. In the case of the present invention, the upward deflection of the aileron results in a negative change in $C_L$. The wing deploying the present aileron then produces less lift than the other wing with its inventive aileron maintained in the neutral position. Thus, the wing drops and the aircraft is rolled toward the lowered wing into a turn. The upwardly-deflected inventive aileron protrudes into the stream of air flowing over the wing, creating form drag, to rotate the nose of the aircraft toward the turn. Unlike activation of conventional ailerons, this action produces favorable yaw.

The present invention's functional property of favorable yaw aids in both spin avoidance and spin recovery. For an airplane using the present aileron system, the same stick movement used by a pilot to roll right and out of the left hand spin described above, results in only the right aileron going up and on the outside of the spiral. The outward yawing motion plus the outside wing being depressed will roll the airplane away from the spiral center and aid in recovering from the spin. This will augment the opposite rudder input usually used for spin recovery. The form drag associated with the present invention also aids in spin recovery. Depending on the installation, this effect may be accentuated by the simultaneous deployment of the auxiliary flap panel with the aileron panel, creating a drag rudder on one wing, in this example the right wing.

Favorable yaw also ameliorates the difficulties associated with asymmetric loss of power during flight in multi-engine aircraft. The minimum controllable airspeed, $V_{mca}$, will decrease with use of the present invention, as will the required rudder authority and size, while aircraft performance will increase.

Since it deflects upwardly only, the aileron system of the present invention frees up the entire wing's trailing edge for installation of high lift or drag devices to lower approach, landing and takeoff speeds. With lower approach and landing speeds, aircraft, particularly heavy commercial or high performance military aircraft, may gain access to shorter runways. Carrier-borne aircraft may have slower, safer approaches. These aircraft will have lower requirements for ground braking and the maintenance of such systems. Additionally, the invention may be deployed symmetrically on both wings for flight path control, or symmetrically in concert with flaps to function as air brakes or drag rudders.

The present invention is a simple system. It results in aircraft control systems and overall operations that are safer, more efficient and aerodynamically correct, simpler and more economical to produce and maintain. It lends itself to systems of lighter weight, with the weight savings being traded for increased fuel, cargo or passenger capacity, or simply a lighter-weight aircraft.

Other objects and features and additional advantages of the invention will be apparent from the foregoing and the following description and discussion, in conjunction with the accompanying drawings.

BRIEF DESCRIPTION OF THE DRAWINGS

FIG. 4 is a perspective view of a wing showing the main flaps in their neutral positions and the aileron system of the present invention deflected up for flight path control.

FIG. 4A is a cross section of the wing along view line 4A—4A in FIG. 4.

FIG. 4B is a view similar to FIG. 4, but showing the auxiliary flaps of the aileron system in their neutral positions.

FIG. 4C is a cross section along view line 4C—4C in FIG. 4B.

DETAILED DESCRIPTION OF THE PREFERRED EMBODIMENTS

Figure 1A:
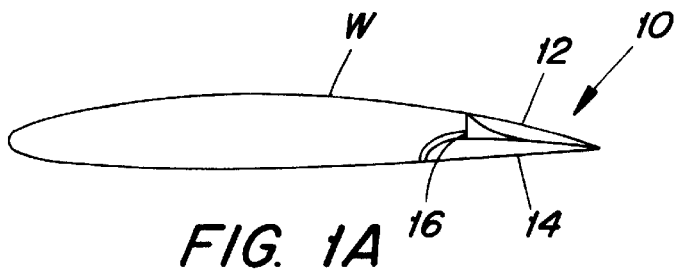
FIGS. 1A–1C each shows an airfoil section with the aileron system of the present invention, in different operational modes.
Figure 1B:
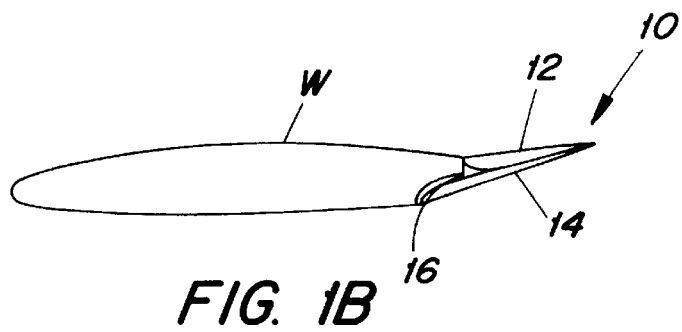
Figure 1C:
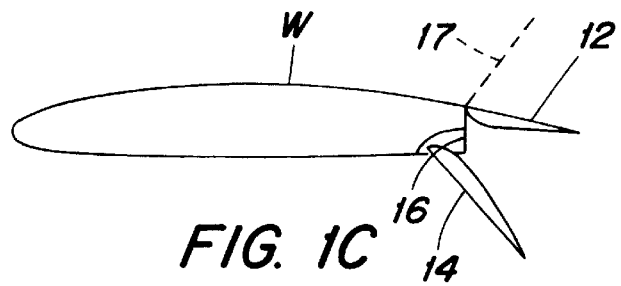

FIGS. 1A, 1B and 1C each shows a cross section, or an airfoil section, of a wing W incorporating the improved aileron system 10 of the present invention, illustrating different stages in the deployment of the system. The aileron system 10 is shown to include an upper, aileron panel 12 and an auxiliary flap panel 14 stowed underneath the aileron panel. Both the aileron panel 12 and the auxiliary flap panel 14 are separately hinged to the wing's rear spar 16 or other hard points, and can be operated independently, but can also be made to operate in unison for certain functions when they are engaged. In FIG. 1A, both panels are shown in their respective neutral or retracted positions, in which they form smooth continuations of the respective upper and lower surfaces of the wing W. With the aileron panel 12 deflected upwardly, as shown in FIG. 1B, the auxiliary flap panel 14 also is made to deflect upwardly to form an aerodynamically efficient "aileron" in the usual sense. With the auxiliary flap panel 14 deployed downwardly, as shown in FIG. 1C, the aileron panel 12 can remain in the neutral position (shown in solid lines) or be deflected up only, as indicated by the broken line 17.

Figure 1D:
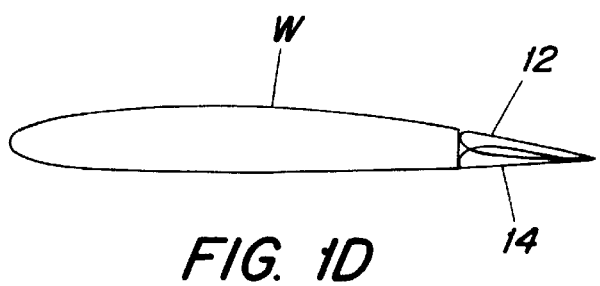
FIG. 1D shows an airfoil section with an alternate embodiment of the aileron system of the present invention.
Figures 1E, 1F, 1G:
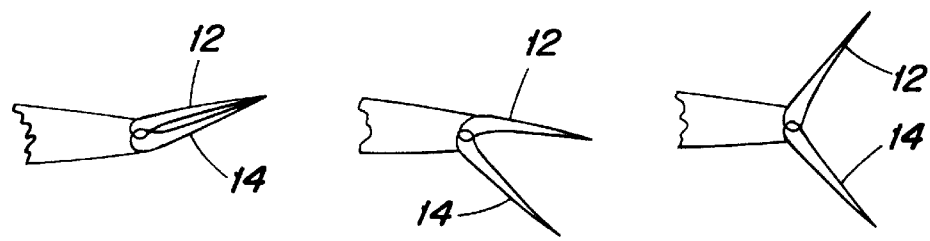
FIGS. 1E–1G show different operational modes of the embodiment of FIG. 1D.

Instead of separately hinging the auxiliary flap panel and the aileron panel, these panels may be hinged to rotate about a common axis, as shown in FIG. 1D. In this configuration as well, the aileron panel 12 can be deflected upwardly (FIGS. 1E and 1G), but is not deflected downwardly beyond its neutral position (FIG. 1F), whereas the auxiliary flap panel 14 can be deflected upwardly in unison with the aileron panel and down independent of the aileron panel.

For small, general aviation aircraft, a simplified version of the aileron system illustrated in FIGS. 1A–1C may be utilized to facilitate construction and minimize weight. The auxiliary flap panel may be left completely independent of the aileron panel. Its retracted or stowed position would be the neutral position, as shown by the auxiliary flap panel in FIG. 1A, and it would move downwards only as a flap, such as shown by the auxiliary flap panel in FIG. 1C. However, the auxiliary flap panel would not move with the aileron in its upward excursions.

In the following description, the term "aileron" will refer to both the aileron panel and the auxiliary flap panel when they are operated to move as a unit. The term "aileron panel" will refer to the upper panel when it functions as an upwardly-movable only aileron, independently of the auxiliary flap panel. Similarly, the term "auxiliary flap panel" will refer to the lower panel when it functions as a flap, independently of the aileron panel.

Figure 2:
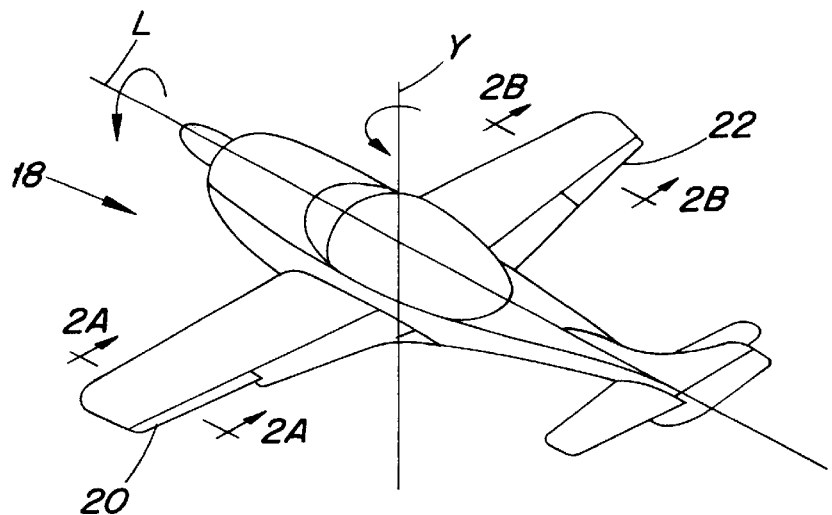
FIG. 2 is a perspective view of a general aviation type aircraft with wings incorporating the aileron system of the present invention, executing a banking turn to the left.
Figure 2A:
FIGS. 2A and 2B each is a cross section of the wing, along view lines 2A—2A and 2B—2B, respectively, in FIG. 2, showing the position of the aileron during the turn.
Figure 2B:

In FIG. 2, a general aviation type aircraft 18 is depicted making a left banking turn by rotating about the aircraft's longitudinal axis L. In this maneuver, the aileron on the left wing or left aileron 20 is deflected up while the right aileron 22 remains in its neutral position, as shown respectively by the wing cross section depicted in FIGS. 2A and 2B. The angular deflection required for a banked turn is comparable to that of a conventional aileron. The rate of roll can be modulated by varying the deflection angle. This illustrates the basic roll control function of the present invention in which no adverse yaw or rotation about the vertical axis Y is produced. On the contrary, favorable yaw results. With conventional ailerons, this same maneuver would be achieved by simultaneously deflecting the left aileron up and the right aileron down, resulting in the adverse yaw discuss above. In the present invention, the aileron panel is not deflected downwardly beyond its neutral position.

Each of the ailerons 20 and 22 can be modulated independently to deflect to any degree in order to provide the roll rate desired, or be deflected simultaneously for flight path control or air brakes, including the extreme case of maximum upward deflection of both for ground control, for landing roll-out. Wing panels conventionally deployed for the latter mode are usually referred to as ground control spoilers. The inventors consider "spoiler", a term which originated in the glider or sail plane community, a misnomer for panels used in this mode as brakes. A spoiler is an aerodynamic obstruction positioned on top of the wing, perpendicular to the air stream, at approximately the midpoint of the wing chord. When deployed, a spoiler creates highly turbulent flow over the top of the wing and actually destroys, or "spoils" the wing's lift, thus the name spoiler. When the lift is spoiled, the weight of the wing exceeds the lift supporting it and causes the wing to drop.

The ground control "spoiler" is an aerodynamic drag device primarily. It does create turbulence, mostly behind the wing. This drag panel acts effectively as a flap mounted and deployed on the upper surface of the wing, and instead of creating lift as a conventional flap on the wing's bottom, this panel behaves as a negative flap creating a downward force, or negative lift, which is beneficial in applying more force on the aircraft's landing gear to permit harder wheel braking. This is done best when the lower, auxiliary flap panel is retracted once the airplane is on the ground. If the upper drag panel and the lower flap panel are deployed at the same time the forces tend to negate each other. Under this circumstance the drag force of both panels are still in effect and become an air brake. It can become a drag rudder if only one wing's control surfaces are deployed in this manner.

Figure 3:
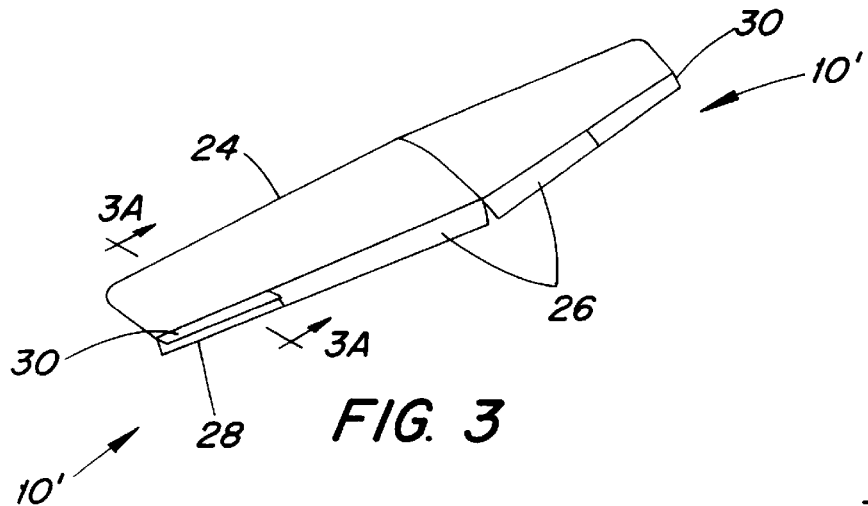
FIG. 3 is a perspective view of a wing showing the main and aileron auxiliary flaps deployed to form a full-span flap and the upper aileron panel of the present invention in the neutral position.
Figure 3A:
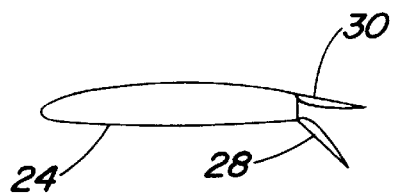
FIG. 3A is a cross section of the wing along view line 3A—3A in FIG. 3.

The present aileron system can be used for different modes of the flight regime. FIG. 3 shows a general aviation type wing 24, such as the wing shown in FIG. 2, with full-span flaps formed by the main flap 26 and the auxiliary flap 28 deployed together. Both the main flap 26 and the auxiliary flap 28 are shown in FIG. 3 at maximum deflection. In this mode the aileron panels 30 can remain stowed in the neutral position (FIG. 3A) or each can be deflected up individually for roll control. The ailerons 10' can be deflected upwards on both sides simultaneously to provide modulated flight path control when the main flaps 26 are retracted, as shown in FIGS. 4 and 4A. The auxiliary flap panel 28 moves upwardly with the aileron panel 30 in this case. An alternate method is to deflect upwards only the aileron panels 30, with the auxiliary flap panels remaining in their neutral positions, as shown in FIGS. 4B and 4C.

Figure 5:
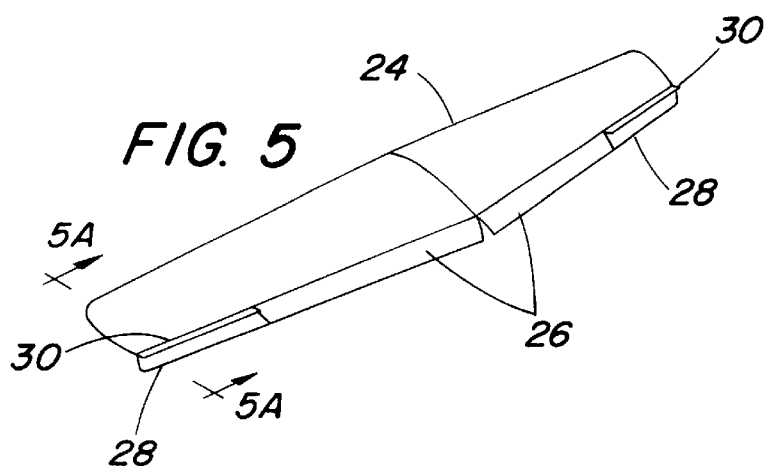
FIG. 5 is a perspective view showing a wing with full-span flaps deployed and the upper aileron panels of the present invention deflected up simultaneously for air braking.
Figure 5A:
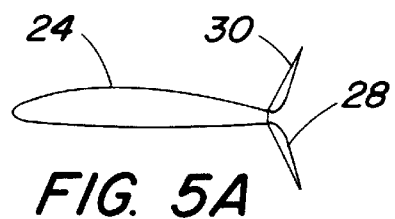
FIG. 5A is a cross section of the wing along view line 5A—5A in FIG. 5.
Figure 5B:
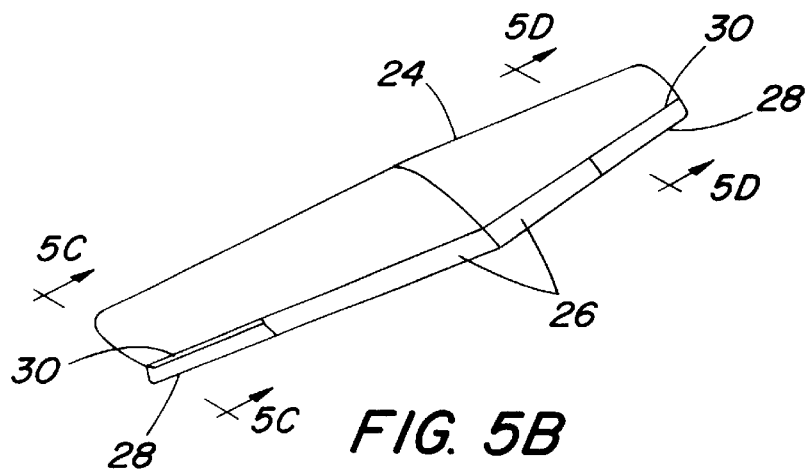
FIG. 5B is a view similar to FIG. 5 showing the aileron system of the present invention deployed as a drag rudder.
Figure 5C:
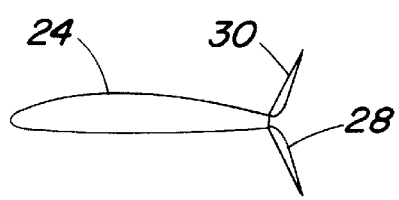
FIGS. 5C–5D are cross sections along view lines 5C—5C and 5D—5D, respectively, in FIG. 5B.
Figure 5D:
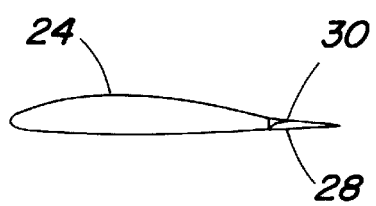

FIG. 5 depicts the control surfaces of the aileron system 10' deployed in the air brake mode. Actually, the air brake can be deployed in two ways. The first method is in conjunction with the full-span flaps, e.g., in preparation for landing, as shown in FIG. 5. When further reduction of airspeed is required, the aileron panels 30 can be deflected up simultaneously and symmetrically on both wings to form the air brake. The aileron panels continue to provide roll control by the superimposition of individual and independent further upward deflection. The second method is during level, or cruise, flight when a decrease in airspeed is desired. Both aileron panels 30 can be deflected up and both auxiliary flaps 28 deflected down to form an air brake. Note FIGS. 5 and 5A. A variation of the second method can be attained by deploying the aileron panel 30 and the auxiliary flap panel 28 together on one wing only, with the corresponding control surfaces on the other wing remaining retracted or in their respective neutral position, to form a drag rudder as shown in FIGS. 5B, 5C and 5D. The drag rudder, as the name implies, performs the same function as the tail rudder, by dragging, or yawing one wing to the direction desired.

Figure 6:
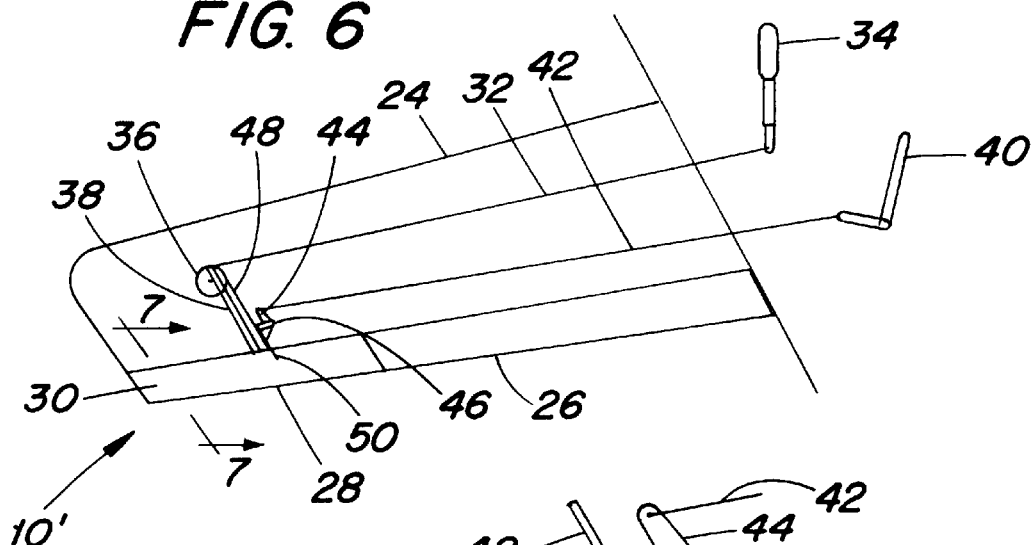
FIG. 6 is a schematic showing an embodiment of a system for operating the aileron system of the present invention.
Figure 6A:
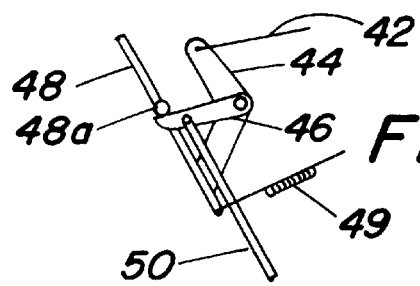
FIG. 6A shows, to a larger scale, parts of the operating system illustrated in FIG. 6.

FIG. 6 schematically depicts a general aviation type wing 24 with an example of an operating system to implement control of the ailerons. A cable or tubing linkage 32 is connected between a control stick 34 and a cam/pulley arrangement 36 coupled to a push rod linkage 38 to actuate the aileron 10'. As shown in FIGS. 6 and 6A, the auxiliary flap panel 28 can be actuated by a cockpit lever 40 connected by another cable or tube linkage 42 to transfer bell cranks 44 and 46 (shown in schematic form), which in turn actuate linkage 50 to move the auxiliary flap 28 up or down on command from the pilot. The push rod 48 is biased by a spring 49. Other mechanisms may perform the same functions by transducing the pilots actions through any means of control input, such as conventional stick or yoke movement, or pressure sensing device, or even neural impulse or electro-encephalographic interpretation, with physical implementation by any electrical, mechanical, hydraulic or other motive force.

Figure 7A:
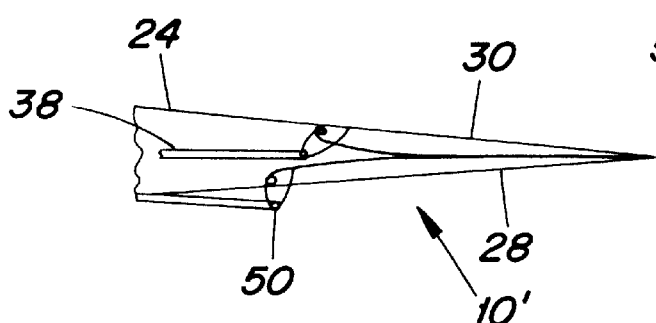
FIGS. 7A–7C each shows a cross section of the wing along view line 7—7 in FIG. 6, schematically illustrating different deployment modes of the aileron system of the present invention.
Figure 7B:
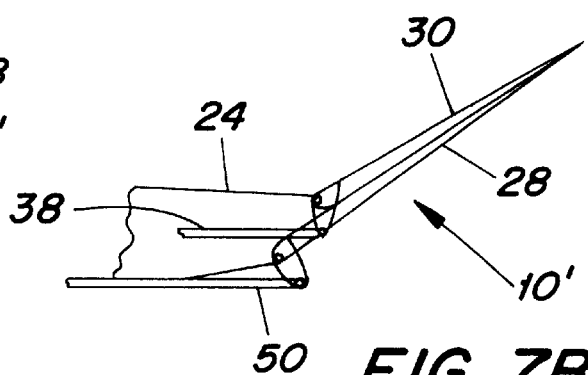
Figure 7C:
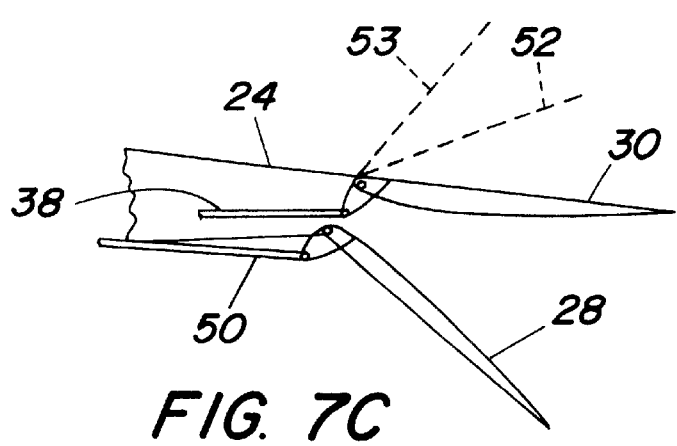

Operation of the controls can be seen by referring to FIGS. 6, 6A and 7A–7C. The aileron panel 30 and the auxiliary flap panel 28 are shown in their respective neutral position in FIG. 7A, and FIG. 7B shows the aileron 10' deflected up. With the auxiliary flap panel 28 not deployed in the flap mode, the auxiliary flap's control cable 42 is allowed to unload, and push rod 48 will engage transfer bell crank 46 to move a second push rod 50, which in turn moves the auxiliary flap panel up in concert with the aileron panel 30. In FIG. 7C, the aileron panel 30 is in the neutral position and the auxiliary flap panel 28 is deflected down. When the auxiliary flap lever 40 is actuated in the cockpit via the cable 42, tension will rotate transfer bell crank 44, to move push rod 48 sideways to disengage from transfer bell crank 46. Note that the auxiliary flap lever and the main flap lever can be combined. With the auxiliary flap panel 28 disengaged, the aileron panel 30 is free for independent deployment up, modulated for aileron roll function up to a position indicated by line 52 or modulated flight path control up to maximum deflection indicated at 53 for ground control drag panel functions.

Cable or tubing arrangements comprise very simple control systems commonly found on small, light aircraft. They are by no means the only systems capable of performing the functions described, and are chosen only as examples. The controls can be actuated by any means capable of transducing a pilot's actions, including but not limited to conventional stick or control yoke and rudder, flight directors or other automated or computerized pilots, fly-by-wire or even voice command or neural impulse. Control actuation may be implemented via cables, tubings, pushrods, or electric servo motors, electromagnetic actuators, hydraulic cylinders, pneumatic systems, or any method of transferring force to cause mechanical movement of the aileron and flaps.

For high performance aircraft, particularly heavy commercial or military aircraft, the number of possible configurations of the ailerons and flaps may be very large. Such complex configurations and deployment schedules might be best managed by pilot control commands implemented through a computer.

Figure 8:
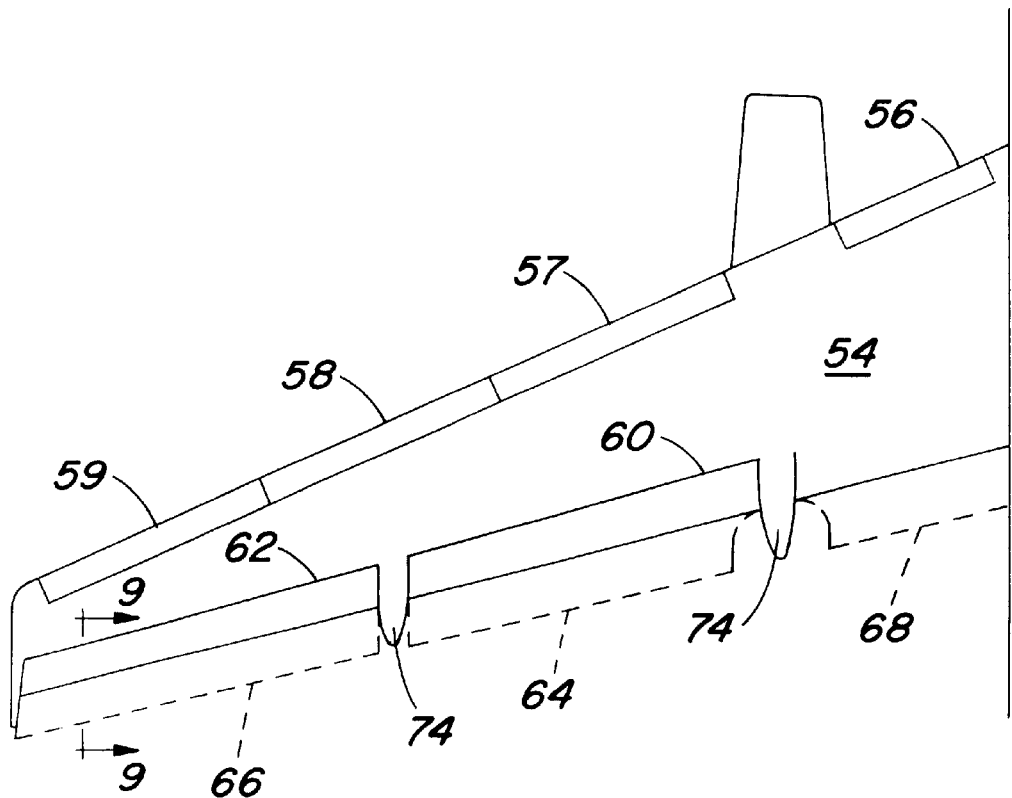
FIG. 8 is a plan view of a typical commercial jet aircraft wing with various flaps and aileron arrangements.

A plan view of a commercial jet aircraft wing 54 is shown in FIG. 8, with leading edge Krueger flaps 56, 57, 58, and 59. The inboard aileron 60 and the outboard aileron 62 line the wing's trailing edge. The broken lines indicate the extended position of a two-section Fowler flap 64 and 66 which form the auxiliary flap panel for the ailerons 60 and 62, respectively, and the extended position of the main Fowler flap 68. The full-span flap system can be comprised entirely of two-section Fowler flaps. That is, the lower auxiliary flap panel can be a Fowler flap. The aileron panel may extend from section 62 to section 60, with the aileron panel of the inboard section 60 being deployed as a flight path control and ground control drag panel only. In this application the auxiliary flap panel need not follow the aileron panel's upward movement, since in this particular application its function is to create drag. Any combination of flap types can be used for the main and the lower auxiliary flap panel of the aileron system as desired to suit the engineering, production, or performance objectives of individual applications.

Figure 9:
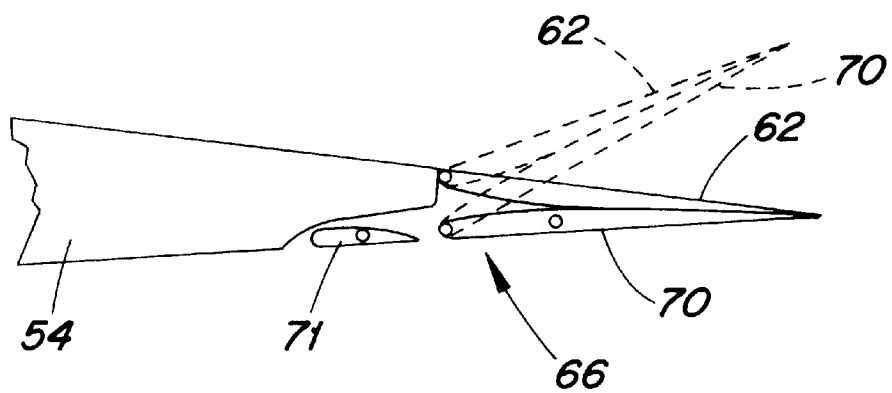
FIG. 9 is a wing cross section along view line 9—9 in FIG. 8, with an embodiment of the present invention incorporating a two-sectioned Fowler flap in the stowed position.
Figure 10:
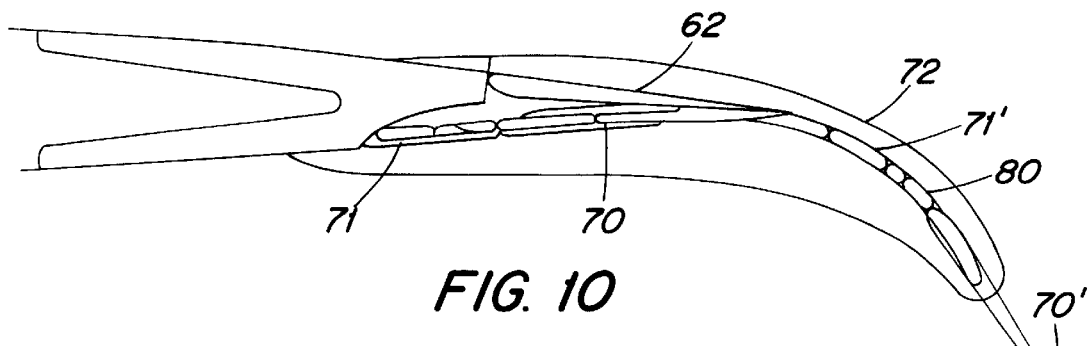
FIG. 10 shows a portion of the operating subsystem for the Fowler flap shown in FIG. 9.
Figure 11A:
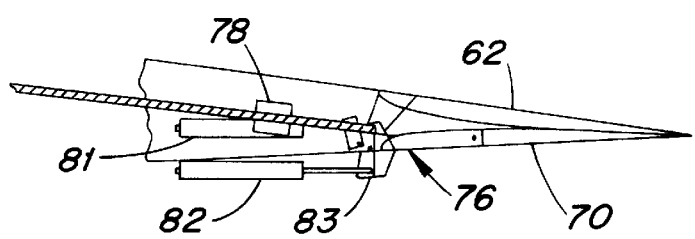
FIGS. 11A–11C each is a view of the wing shown in FIG. 9, depicting the control surfaces in different stages of operation.

FIG. 9 shows in schematic form an embodiment of the aileron system 62 in which the lower auxiliary flap 66 is a two-section Fowler flap having sections 70 and 71. The broken lines indicate the upward deployed position of the aileron 62. An example of a suitable guide for the auxiliary flap panel 66 comprised of the Fowler flap is shown in FIG. 10, wherein a track 72 guides the deployment of the two-section Fowler flap. Track 72 is disposed in a fairing located on the wing, at the ends of the flaps, such as fairings 74 visible in FIG. 8. These Fowler flap sections are shown in the stowed positions as 70 and 71 and in the maximum extended positions as 70' and 71'. The larger of the Fowler flap sections 70 rides on a shuttle 76, shown in FIG. 11A, which is guided along the track 72. Flap deployment is accomplished by electrically-driven screw jacks 78, which are attached to the shuttle 76. Rotation of the screw effects a rearward push on the screw jack 78 to extend the larger of the Fowler flap sections 70, which in turn pulls out the smaller section of the Fowler flap 71 via a connecting linkage 80 (FIG. 10.) A hydraulic cylinder 82 actuates the auxiliary flap, which is the larger of the two Fowler flap sections, through a transfer bar lever 83.

Figure 11B:
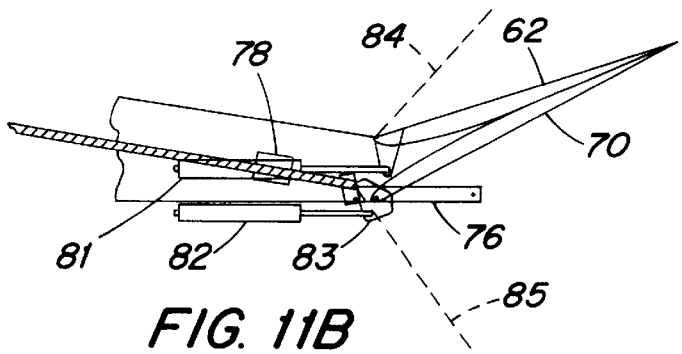

The aileron system is shown in the up deflected position in FIG. 11B. The auxiliary flap 70 is hinged at the front end to the shuttle 76, and the rear part of the flap is lifted away from the shuttle. When the auxiliary flap 70 is in the fully retracted position (FIG. 11A) it is automatically released mechanically from the shuttle 76. When the auxiliary flap is ready for extension, electric microswitches (not shown) will signal the screw jack motor circuits (not shown) that the auxiliary flap is stowed in its neutral position. At that time the screw jack motor will begin operating. A mechanical device on the shuttle will automatically lock the flap to the shuttle and begin its deployment along the track. The broken lines 84 and 85 indicate the aileron panel and the auxiliary flap panel are in one of the air brake mode positions.

Figure 11C:
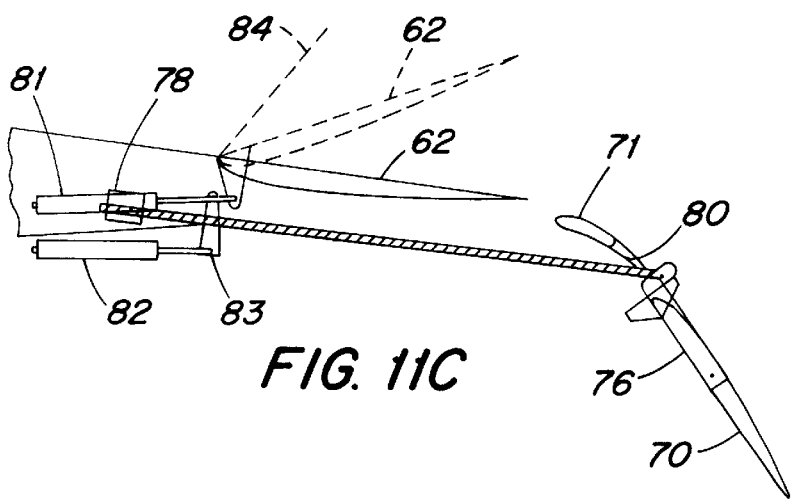

The fully deployed auxiliary Fowler flap is illustrated in FIG. 11C, which depicts the relationship between the two sections of the Fowler flaps. The aileron panel 62 can be operated independently in this situation, from its stowed neutral position (solid lines) to an intermediate upward deflection (phantom lines) and further to a maximally deflected position indicated by the line 84.

Figure 12:
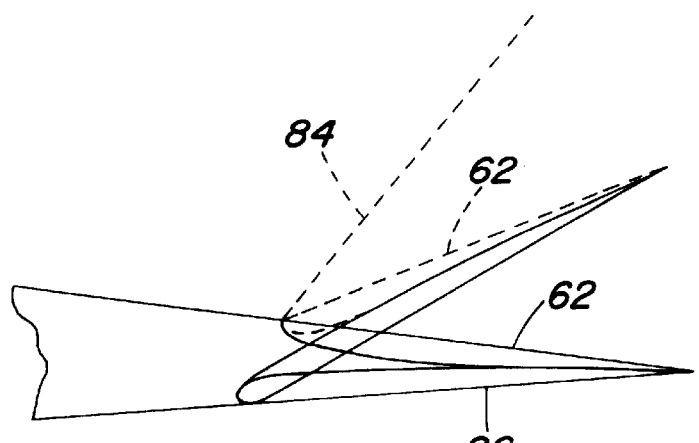
FIG. 12 shows schematically an embodiment of the present invention with a single-section Fowler flap.

A schematic drawing is presented in FIG. 12, to illustrate an alternate form of flap that may be utilized with the aileron system 62. In this embodiment a single-section Fowler flap 86 is shown. Phantom lines show the deployed position of the auxiliary panel (Fowler flap) 86 and the aileron panel 62. The broken line 84 indicates the position of the aileron panel 62 in its functional mode as a ground control drag panel. The single-section Fowler flap is less complicated, and requires a smaller track and other deployment mechanisms which can be contained in a smaller, more streamlined fairing. This results in a lighter structure, etc.

Figure 13:
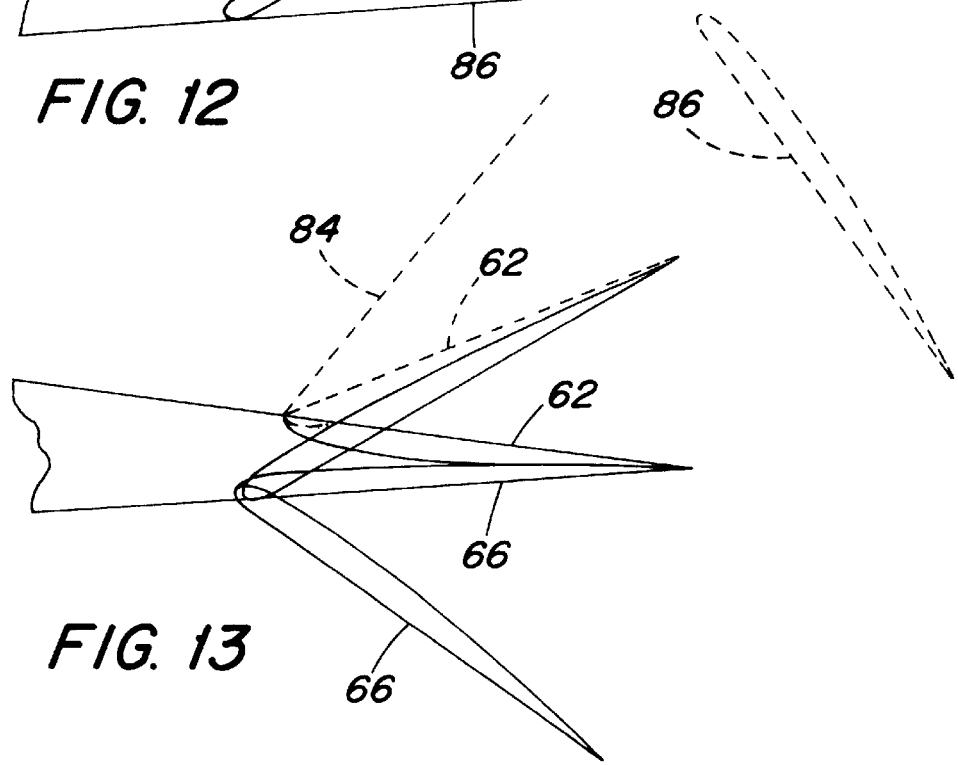
FIG. 13 shows schematically an embodiment of the present invention with a split flap.

In FIG. 13, a simple split flap arrangement is shown. The features of the present invention are still preserved. As above, this is a simpler construction but with a trade-off in efficiency and performance.

Figure 14:
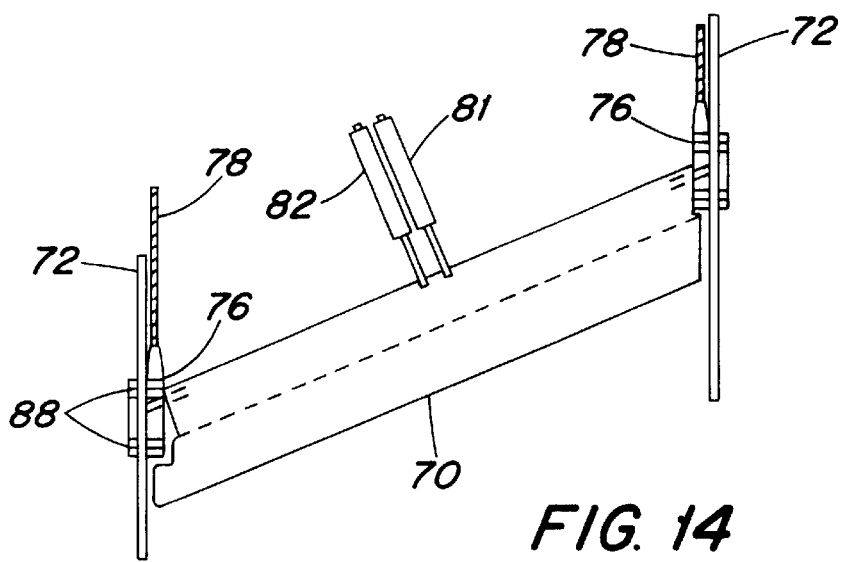
FIG. 14 is a plan view of the present aileron system for a swept wing aircraft, schematically illustrating some components of the operating mechanism.
Figure 15:
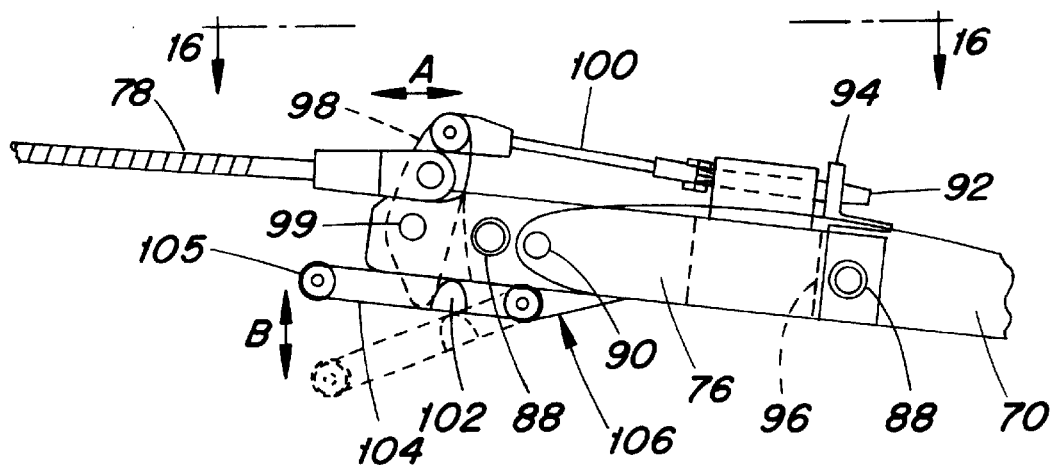
FIG. 15 shows, to a larger scale, additional details of the operating mechanism illustrated in FIG. 14.
Figure 16:
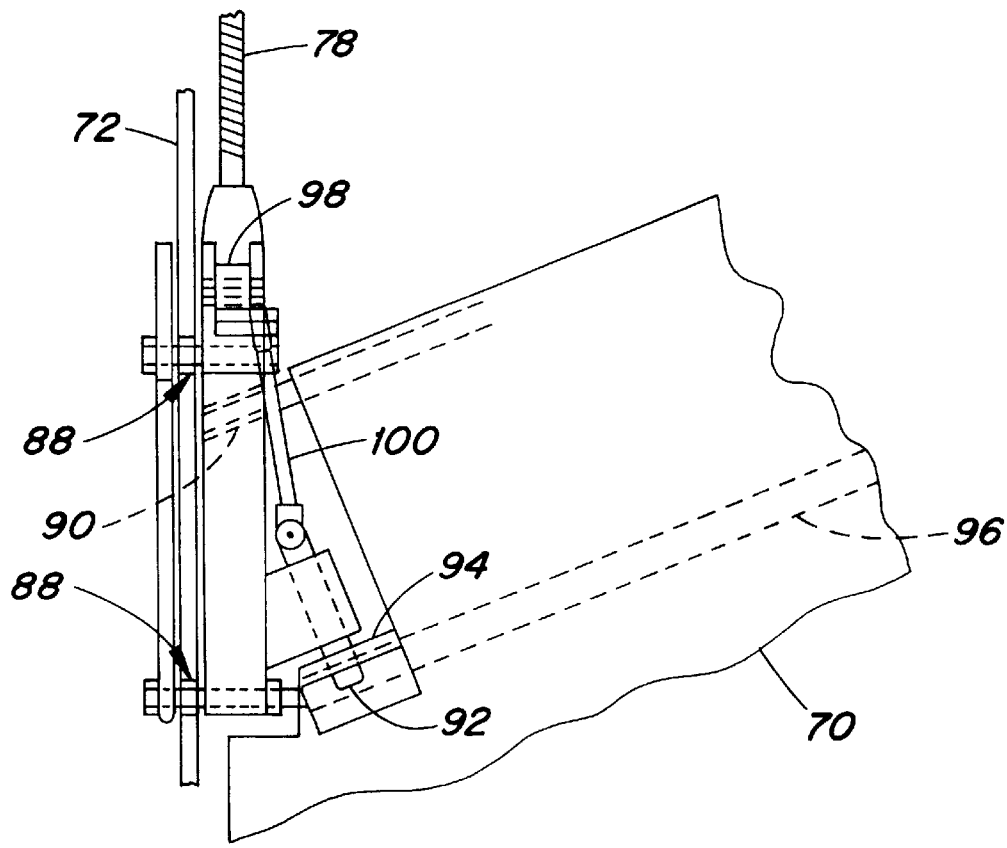
FIG. 16 is a view along view line 16—16 in FIG. 15.

FIG. 14 is a schematic plan view showing the aileron system of the invention 70 installed on a swept-wing jet aircraft. The operating devices used to control the aileron system are similar to those described with respect to FIGS. 10 and 11A–11C. The auxiliary flap 70 is retracted beneath the aileron (not shown), and each end of the flap is supported by a shuttle 76, which in turn rides on a track 72 guided by rollers 88. Hydraulic cylinders 81 and 82 actuate the movements of the aileron panel and the auxiliary flap panel separately. The extension and retraction of the shuttles are effected by a pair of electromechanical screw jacks 78. Additional details of the shuttle 76 are shown in FIGS. 15 and 16. Two rollers 88 guide the shuttle 76 on the track 72. The leading edge of the flap 70 is pivotally supported on the shuttle 76 by a hinge 90. Toward the rear of the flap, at about ⅓ of the flap chord, a locking mechanism is provided which includes a bolt 92 passing through a strong point bracket 94 attached to the flap structure, a spar, or some equivalent structure. A lever bar 98, hinged at 99 to the shuttle, can rotate back and forth (arrow A) to actuate the locking bolt 92 via a linkage 100. The lever bar 98 is attached to a screw jack 78, and a detent block 102 attached on a lever 104 with a roller tip 105, can rotate with an up and down motion, indicated by the arrow B. The roller tip 105 rides on a roller guide (not shown) which governs its movement to release the detent block 102 at the appropriate location.

The sequence of auxiliary flap extension begins with the screw jack 78 being rotated to push back on the lever bar 98, which in turn pushes the linkage 100 to lock the bolt 92 onto the bracket 94. Further movement causes the shuttle 76 to move and extend the auxiliary flap 70, such as depicted in FIGS. 11C and 12. At the same time the roller-tipped lever 104 is guided to rotate upwardly, to place the detent block 102 between the lever bar 98 and a shuttle step 106. The lever bar 98 is then locked and prevented from rotating. The retraction sequence is the reverse of the above extension sequence. When the lower auxiliary flap panel 70 is fully retracted, the roller guide will rotate the roller-tipped lever 104 downward, to extract the detent block 102. The lever bar 98 then can rotate forward to extract the bolt 92. The lower auxiliary flap panel 70 then is unlocked from the shuttle 76, but hinged at the forward end and is free to rotate around this hinge point 90.

The operation of the aileron system, in conjunction with an aircraft's conventional flap system to provide aircraft control can be better understood from the following description of its operation through a hypothetical flight of an aircraft from takeoff to landing, for example, a large commercial jet aircraft. Typically, the pilot would select flap deployment for takeoff. Here, both the main flap and the auxiliary flap panel beneath the aileron panel would be deflected downward from their stowed, neutral positions. During and after the takeoff the upwardly deflecting aileron panel would be deployed to maintain full and independent roll control authority.

After gaining altitude and speed, the pilot would retract the flaps, with the auxiliary flap panel then moving to its stowed position where it effectively becomes one with the aileron panel to form an aerodynamically efficient "aileron." This integrated aileron will maintain roll control during cruise flight with a drag efficient aileron. To roll the aircraft to the left, for example, the pilot would raise the left aileron. The right aileron would remain in its neutral position. No adverse yaw would be experienced during this deployment, and the rolling motion would be modulated continuously by pilot control input.

For descent, the pilot might reduce power. With this invention, however, the power settings could be left unaltered, or the descent rate augmented with the flight path control mode of the aileron system by raising the ailerons of both wings symmetrically. The aircraft could descend in this fashion with wings level, the degree of augmentation of the sink rate continuously modulated by the simultaneous deflection of the ailerons. Full roll control authority would be maintained by superimposing differential aileron deflection. During this maneuver the aircraft sinks or descends but remains in a level attitude or nearly so, the cabin floor likewise, a quality appreciated by flight attendants and passengers. Airspeed could remain constant during descent even with throttle settings little changed from cruise. On retraction of the ailerons, the aircraft would stop its descent and resume its previous level flight path and airspeed. Steeper descent rates could be obtained by symmetrical deployment of the drag rudders, that is, the aileron and auxiliary flap panels together, on both wings as air brakes. These air brakes with their outboard location on the wing would not be limited in deployment, as are many conventional speed brakes with their inboard location, by turbulent air flow created for the tailplane to fly through.

During approach to landing, the auxiliary and main flaps would be deployed independently for small changes in wing camber, leading to deployment of both the main and auxiliary flaps together to produce full-span flaps for increased lift and/or drag at low speeds. Flap deployment may be combined here with symmetrical deployment of the aileron panels as in the above-described flight path control mode to provide an air braking function. Again, superimposing differential aileron deployment would provide roll control.

On touchdown, the pilot would retract all flaps and raise the drag panels and the aileron panels as additional drag panels. This action would place additional weight on the wheels for better ground contact that would allow harder wheel braking and at the same time exert pressure (as a function of speed) to hold the aircraft on to the ground.

The invention also offers advantages in dealing with asymmetric thrust conditions or power loss, a scenario that drives much of multi-engine aircraft design and certification requirements. With asymmetric engine power output, the aileron of this invention or the drag rudder function would provide directional control superior to that of current systems, with less compromise in aircraft performance and decreased need for rudder size and control authority. Asymmetric thrust, which occurs for example when there is greater power output by the engine or engines on the right side of an aircraft, or there is less power output by the engine or engines on the left side, will cause a yawing and turning motion of the aircraft to the left, towards the side with less power. This is usually considered an emergent situation. This yawing motion typically is counteracted with rudder input. The combination of asymmetric thrust and compensatory rudder input will allow the aircraft to hold a linear course, but the aircraft now also will be sideslipping, or have a sideways component to its motion. This sideslip induces a large amount of drag and may cause severe decrease in aircraft performance at a time of greatly reduced power and aerodynamic control authority. This is counteracted by banking or rolling the wings toward the side with more power. With conventional aileron control systems this will, as with normal flight situations, induce adverse yaw which will require even greater rudder deflection, with the demands on the rudder now including compensation for both the asymmetric power condition as well as the adverse yaw induced by banking the aircraft to eliminate sideslip.

An aircraft with conventional empennage equipped instead with the present invention would still require rudder input to counteract yaw generated by the asymmetric thrust condition. But banking toward the side of greater thrust to compensate for sideslip would generate favorable yaw, aiding the rudder rather than demanding even more rudder input. The rudder then could be of smaller size, generating less aerodynamic drag in all flight conditions, weighing less and costing less to produce and to maintain. Deployment of both the present invention and the rudder under these circumstances would induce less drag than conventional control surfaces, yielding greater aircraft performance under these worrisome conditions.

Disclosed herein is a unique aileron system in conjunction with flap arrangements which offer multiple function with advantages over past and present systems for aircraft control. Among its many advantages, the present invention eliminates adverse yaw associated with previous systems of aileron roll control. Spin entry involves the creation of adverse yaw, usually at low flight speeds. The invention allows airplanes to maneuver well-controlled at lower speeds and provides favorable rather than adverse yaw, decreasing the likelihood of spin entry, improving safety. The present invention operates on the wing's upper surface only. The entire trailing edge is made available for high lift devices, e.g. flaps and other functionaries that deflect or move downwards. Any sort of high lift or drag device that requires varying the wing trailing edge downwards can be implemented with use of the invention. Full-span ailerons may be installed for higher roll rates desired for acrobatic or other aircraft demanding high maneuverability.

The present aileron system can be employed to deploy simultaneously on both wings for flight path control. No rolling motion is caused by symmetrical deployment. The equal deployment results in an equal decrement of lift on both wings and a descending flight path with small changes in pitch attitude and power settings. This effect, as all others with the invention, can be modulated continuously in contrast to that of many conventional air or speed brakes. In this mode, control of the individual ailerons provides roll control.

When the aileron system is used in concert with flaps, air braking results. Asynmmetric deployment results in "drag rudders" and selective left or right yaw. With large deflection angles the aileron system may be used as a "drag plate", useful, for example, for braking on landing roll-out.

The invention offers many favorable economies. It is simple in design and construction. No new technologies are necessary for production. It allows for full-span flaps, among other trailing edge devices. A typical commercial airliner could replace its dual conventional ailerons, multiple spoilers, complicated flap systems and all their attendant actuating systems with simply one aileron system of the present invention and one flap on each wing. Construction would be simpler and less expensive. Maintenance would involve fewer systems with fewer opportunities for malfunction. The wing would be cleaner, fitted with fewer of the multiple protruding pods now present for actuating systems, and more aerodynamically efficient and correct in operation. The weight saved could be traded for additional fuel, improving range, or additional cargo or passengers, or simply result in a lighter airplane with better performance. Lower takeoff and landing speeds impose less stress on landing gear systems, as well as pilots, and allow aircraft to use smaller airfields. Utility is increased and safety enhanced.

Implementation of the invention control system does not result in any compromise or negative trade-off in any aspect of aircraft performance. Neither is it more expensive to engineer or produce. To the contrary it results in performance increases and economies in production and operation under every consideration.

Although not specifically described herein or illustrated in the drawings, it is understood that all of the elements described above are arranged and supported in an operative fashion to form a complete, operative system. Such complementary structure is known and would be provided by a person skilled in the art. Numerous modifications and variations of the present invention are possible in light of the above disclosure. It is therefore to be understood that within the scope of the invention defined in the appended claims the invention may be practiced otherwise than as specifically described herein.

What is claimed is:

1. An aerodynamic control system for roll control of an aircraft around a longitudinal axis of the aircraft, the aerodynamic control system comprising:

a first wing having a rear portion, the first wing having a top surface and a bottom surface;

an aileron assembly having an upper panel and a lower panel, the upper panel being pivotally attached to the top surface of the first wing at the rear portion and the lower panel being pivotally attached to the bottom surface of the first wing at the rear portion, wherein the upper panel and the lower panel are operatively related such that both the upper panel and the lower panel are deflected in an upward direction as a unit from both an upper panel neutral position and a lower panel neutral position, the upper panel having an upper surface where the upper surface of the upper panel forms a continuation of the first wing top surface when the upper panel is in the upper panel neutral position, wherein the upper panel is limited to deflect only upwardly relative to the upper panel neutral position, the lower panel having a lower surface where the lower surface of the lower panel forms a continuation of the first wing bottom surface when the lower panel is in the lower panel neutral position; and a second wing, the second wing being opposite the first wing, the second wing having the aileron assembly such that only the upward deflection of the upper panel of the aileron assembly on the second wing is sufficient to effect roll control of the aircraft without adverse yaw of a nose of the aircraft.

2. An aerodynamic control system as set forth in claim 1, wherein the lower panel can move downwardly from the lower panel neutral position, independently of the upper panel.

3. An aerodynamic control system as set forth in claim 1, wherein the roll control of the aircraft may be effected without adverse yaw of the nose of the aircraft by upwardly deflecting only the upper panel of the aileron assembly of the first wing.

4. An aerodynamic control system as set forth in claim 3, wherein the roll control of the aircraft may be effected without adverse yaw by only upwardly deflecting the upper panel and the lower panel of the aileron assembly of the first wing as a unit.

5. An aerodynamic control system for roll control of an aircraft around a longitudinal axis of the aircraft, the aerodynamic control system comprising:

a first wing having a rear portion, the first wing including a top surface and a bottom surface;

an aileron assembly having an upper panel and a lower panel, the upper panel being pivotally attached to the top surface of the first wing at the rear portion and the lower panel being pivotally attached to the bottom surface of the first wing at the rear portion, wherein the upper panel and the lower panel are operatively related such that both the upper panel and the lower panel arc deflected in an upward direction as a unit from both an upper panel neutral position and a lower panel neutral position, the upper panel having an upper surface where the upper surface of the upper panel forms a continuation of the first wing top surface when the upper panel is in the upper panel neutral position, wherein the upper panel is limited to deflect only upwardly relative to the upper panel neutral position, the lower panel having at least one section, the lower panel having a lower surface where the lower surface of the lower panel forms a continuation of the first wing bottom surface when the lower panel is in the lower panel neutral position; and a second wing, the second wing being opposite the first wing, the second wing having the aileron assembly such that only the upward deflection of the upper panel of the aileron assembly on the second wing is sufficient to effect roll control of the aircraft without adverse yaw of a nose of the aircraft, where the lower panel of both the first wing aileron assembly and the second wing aileron assembly can be extended rearwardly to increase an effective wing area and can be deflected in a downward direction from the lower panel neutral position, independently of the upper panel, to provide flap function for the aircraft.

6. An aerodynamic control system for roll control of an aircraft around a longitudinal axis of the aircraft, the aerodynamic control system comprising:

a first wing having a rear portion, the first wing having a top surface and a bottom surface;

an aileron assembly having an upper panel and a lower panel where the upper panel is pivotally attached to the top surface of the first wing at the rear portion and the lower panel is pivotally attached to the bottom surface of the first wing at the rear portion, wherein the upper panel and the lower panel are operatively related such that both the upper panel and the lower panel are deflected in an upward direction as a unit from both an upper panel neutral position and a lower panel neutral position, the upper panel having an upper surface where the upper surface of the upper panel forms a continuation of the first wing top surface when the upper panel is in the upper panel neutral position, wherein the upper panel is limited to deflect only upwardly relative to the upper panel neutral position, the lower panel having a lower surface where the lower surface of the lower panel forms a continuation of the first wing bottom surface when the lower panel is in the lower panel neutral position; and a second wing, the second wing being opposite the first wing, the second wing having the aileron assembly such that only the upward deflection of the upper panel of the second wing aileron assembly is sufficient to effect roll control of the aircraft without adverse yaw of a nose of the aircraft, where the upper panel of both the first wing aileron assembly and the second wing aileron assembly are deflected up simultaneously to function as drag panels.

7. An aileron system to control roll of an aircraft, the aileron system comprising:

a first wing of the aircraft, the first wing including a rear portion;

a second wing of the aircraft;

an upper panel pivotally attached to the rear portion of the first wing, the upper panel having an upper surface that is flush with an upper surface of the first wing when the upper panel is in an upper panel neutral position such that the upper panel forms a continuation of the first wing; and a lower panel pivotally attached to the rear portion of the first wing opposite the upper panel, wherein the first wing includes a lower surface which is flush with a lower surface of the lower panel when the lower panel is in a lower panel neutral position such that the lower panel forms a continuation of the first wing, the lower panel including a section where a lower surface of the section of the lower panel is flush with the lower surface of the first wing when the lower panel is in the lower panel neutral position such that the section of the lower panel forms a continuation of the first wing, the upper panel and the lower panel being operatively related such that both the upper panel and the lower panel are deflected in an upward direction as a unit from both the upper panel neutral position and the lower panel neutral position.

8. An aileron system as recited in claim 7, wherein the lower panel moves in a downward direction from the lower panel neutral position independently of the upper panel to provide flap function for the aircraft.

9. An aileron system as recited in claim 8, wherein the section of the lower panel further includes a plurality of sections where the plurality of sections move in the downward direction as the lower panel moves in the downward direction.

10. An aileron system as recited in claim 9, wherein the upper panel is deflected in the upward direction to function as a drag panel.

11. A method for controlling movement of an aircraft with an aileron system, the aircraft having a first wing and a second wing opposite the first wing where both the first wing and the second wing have a rear portion, the aileron system includes a first plurality of aileron panels pivotally attached to the rear portion of the first wing and the aileron system includes a second plurality of aileron panels attached to the rear portion of the second wing, the method comprising:

deflecting a first upper aileron panel of the first plurality of the aileron panels into a deflected position;

controlling a first lower panel of the first plurality of the aileron panels where the first lower panel is independently operable from the first upper aileron panel such that the first lower panel deflects with the first upper aileron panel; and maintaining a second upper aileron panel of the second plurality of the aileron panels in an upper panel neutral position such that an upper surface of the second upper aileron panel is substantially flush with an upper surface of the second wing to form a continuation of the upper surface of the second wing in the upper panel neutral position.

12. A method for controlling movement of an aircraft with an aileron system as recited in claim 11, the method further comprising:
positioning the first upper aileron panel in the upper panel neutral position from the deflected position such that an upper surface of the first upper aileron panel is substantially flush with an upper surface of the first wing to form a continuation of the upper surface of the first wing.

13. A method for controlling movement of an aircraft with an aileron system as recited in claim 12, the method further comprising:
positioning a second upper aileron panel of the second plurality of aileron panels in the upper panel neutral position such that an upper surface of the second upper aileron panel is substantially flush with an upper surface of the second wing to form a continuation of the upper surface of the second wing.

14. A method for controlling movement of an aircraft with an aileron system as recited in claim 13, the method further comprising:
positioning the first aileron panel of the first plurality of the aileron panels in a lower panel neutral position such that a lower surface of the first aileron panel is substantially flush with a lower surface of the first wing to form continuation of the lower surface of the first wing.

15. A method for controlling movement of an aircraft with an aileron system as recited in claim 14, the method further comprising:
positioning a second lower panel of the second plurality of the aileron panels in the lower panel neutral position such that a lower surface of the second lower panel is substantially flush with a lower surface of the second wing to form a continuation of the lower surface of the second wing.

16. A method for controlling movement of an aircraft with an aileron system as recited in claim 15, wherein the first upper aileron panel and the first lower panel are operatively coupled to move as a unit from the upper panel neutral position and the lower panel neutral position.

17. A method for controlling movement of an aircraft with an aileron system as recited in claim 16, wherein the second upper aileron panel and the second lower panel are operatively coupled to move as a unit from the upper panel neutral position and the lower panel neutral position.

18. A method for controlling movement of an aircraft with an aileron system as recited in claim 17, the method further comprising:
moving the first lower panel in a downward direction independent of the first upper aileron panel.

19. A method for controlling movement of an aircraft with an aileron system as recited in claim 18, the method further comprising:
moving the second lower panel in a downward direction independent of the second upper aileron panel.

20. A method for controlling movement of an aircraft with an aileron system as recited in claim 19, the method further comprising:
moving the first upper aileron panel and the second upper aileron panel in an upward direction from the upper panel neutral position to modulate flight path control.

21. A method for controlling movement of an aircraft with an aileron system as recited in claim 20, the method further comprising:
moving the first upper aileron panel in the upward direction;
moving the first lower panel in the downward direction;
maintaining the second upper aileron panel in the upper neutral position; and
maintaining the second lower panel in the lower panel neutral position to form a drag rudder.

22. A method for controlling movement of an aircraft with an aileron system as recited in claim 21, the method further comprising:
deflecting the first plurality of aileron panels in the upward direction to function as drag panels for the aircraft.

23. A method for controlling movement of an aircraft with an aileron system as recited in claim 22, wherein the first lower panel and the second lower panel function as auxiliary flaps.

24. A method for controlling movement of an aircraft with an aileron system as recited in claim 23, the method further comprising:
deflecting the first upper aileron panel and the second upper aileron panel in the upward direction; and
deflecting the first lower panel and the second aileron panel in the downward direction to form an airbrake.

25. A method for controlling movement of an aircraft with an aileron system as recited in claim 24, the method further comprising:
deflecting the first upper aileron panel in the upward direction; and
maintaining the second upper aileron panel in the upper neutral position in order to control roll of the aircraft.

26. A method for controlling movement of an aircraft with an aileron system as recited in claim 19, wherein the upper panel and the lower panel form a trailing edge of the wing.

27. A method for controlling movement of an aircraft with an aileron system as recited in claim 19, the method further comprising:
reflexing the wing trailing edge by moving both the first aileron assembly and the second aileron assembly in an upward direction, thereby reducing drag of the aircraft.

28. An aerodynamic control system for roll control of an aircraft around a longitudinal axis of the aircraft, the aerodynamic control system comprising:
a wing having a rear portion, the wing having a top surface and a bottom surface; and
an aileron assembly having an upper panel and a lower panel, the upper panel being pivotally attached to the top surface of the wing at the rear portion and the lower panel being pivotally attached to the bottom surface of the wing at the rear portion wherein the upper panel and the lower panel are operatively related such that both the upper panel and the lower panel are deflected in an upward direction as a unit from both an upper panel neutral position and a lower panel neutral position, the upper panel having an upper surface where the upper surface of the upper panel forms a continuation of the wing top surface when the upper panel is in the upper panel neutral position, the upper panel being limited to deflect only upwardly relative to the upper panel neutral position.

29. An aerodynamic control system for roll control of an aircraft around a longitudinal axis of the aircraft, the aerodynamic control system comprising:
a wing having a rear portion, the wing including a top surface and a bottom surface; and an aileron assembly having an upper panel and a lower panel, the upper panel being pivotally attached to the top surface of the wing at the rear portion and the lower panel being pivotally attached to the bottom surface of the wing at the rear portion, wherein the upper panel and the lower panel are operatively related such that both the upper panel and the lower panel are deflected in an upward direction as a unit from both an upper panel neutral position aid a lower panel neutral position, the upper panel having an upper surface where the upper surface of the upper panel forms a continuation of the wing top surface when the upper panel is in the upper panel neutral position, wherein the upper panel is limited to deflect only upwardly relative to the upper panel neutral position, the lower panel having a lower surface where the lower surface of the lower panel forms a continuation of the wing bottom surface when the lower panel is in the lower panel neutral position.

30. An aerodynamic control system for roll control of an aircraft around a longitudinal axis of the aircraft, the aerodynamic control system comprising:

a first wing, the first wing including a top surface and a bottom surface;

an aileron assembly having an upper panel and a lower panel, the lower panel having a section, the upper panel being pivotally attached to the top surface of the first wing, the lower panel being pivotally attached to the bottom surface of the first wing, the upper panel being limited to deflect only upwardly relative to an upper panel neutral position, the lower panel having a lower surface where the lower surface of the lower panel forms a continuation of the first wing bottom surface when the lower panel is in a lower panel neutral position, wherein the roll control of the aircraft may be effected without adverse yaw of the nose of the aircraft by upwardly deflecting only the upper panel of the aileron assembly of the first wing; and a second wing, the second wing having the aileron assembly wherein the upper panel of the aileron assembly on the second wing remains in the upper panel neutral position during upward deflection of the upper panel of the aileron assembly of the first wing.

31. An aerodynamic control system as recited in claim 30, the upper panel further comprising:

an upper surface where the upper surface of the upper panel forms a continuation of the wing top surface when the upper panel is in the upper panel neutral position.

* * * * *

UNITED STATES PATENT AND TRADEMARK OFFICE
CERTIFICATE OF CORRECTION

PATENT NO. : 6,554,229 B1
DATED : April 29, 2003
INVENTOR(S) : Lawrence Y. Lam and Michael Lam It is certified that error appears in the above-identified patent and that said Letters Patent is hereby corrected as shown below:

<u>Title page,</u>
Item [30], U.S. Application Priority Data, should read:
-- Ser. No. 08/993,241, filed on Dec. 18, 1997, now Pat. No. 6,079,672. --

Signed and Sealed this

Eleventh Day of November, 2003

JAMES E. ROGAN
*Director of the United States Patent and Trademark Office*